United States Patent [19]
Villar

[11] Patent Number: 5,959,044
[45] Date of Patent: *Sep. 28, 1999

[54] METHOD OF CONTROLLING CONTINUOUS ETHYLENE-LIMITED METALLOCENE-CATALYZED COPOLYMERIZATION SYSTEMS

[76] Inventor: Juan Carlos Villar, 36 Martin La., Westbury, N.Y. 11590

[*] Notice: This patent issued on a continued prosecution application filed under 37 CFR 1.53(d), and is subject to the twenty year patent term provisions of 35 U.S.C. 154(a)(2).

[21] Appl. No.: 08/676,720
[22] Filed: Jul. 8, 1996
[51] Int. Cl.⁶ .................................................. C08F 2/06
[52] U.S. Cl. ........................... 526/61; 526/59; 526/90; 526/170; 526/348.6; 526/943
[58] Field of Search .................. 526/59, 61, 90, 526/170

[56] References Cited

U.S. PATENT DOCUMENTS

| | | | |
|---|---|---|---|
| 3,492,283 | 1/1970 | Miller | 260/94.9 |
| 3,551,403 | 12/1970 | Delbouille et al. | 260/94.9 |
| 4,076,924 | 2/1978 | Toyota et al. | 526/125 |
| 4,354,950 | 10/1982 | Hammond et al. | 252/51 |
| 4,542,199 | 9/1985 | Kaminsky et al. | 526/160 |
| 4,544,762 | 10/1985 | Kaminsky et al. | 556/179 |
| 4,752,597 | 6/1988 | Turner | 502/104 |
| 4,992,168 | 2/1991 | Takayama et al. | 210/198 |
| 5,015,749 | 5/1991 | Schmidt et al. | 556/179 |
| 5,015,954 | 5/1991 | Dechene et al. | 324/307 |
| 5,017,714 | 5/1991 | Welborn | 556/12 |
| 5,026,798 | 6/1991 | Canich | 526/127 |
| 5,041,585 | 8/1991 | Deavenport et al. | 556/179 |
| 5,049,819 | 9/1991 | Dechene et al. | 324/307 |
| 5,057,475 | 10/1991 | Canich et al. | 502/104 |
| 5,132,380 | 7/1992 | Stevens et al. | 526/126 |
| 5,153,157 | 10/1992 | Hlatky et al. | 502/117 |
| 5,225,092 | 7/1993 | Emert et al. | 252/50 |
| 5,302,896 | 4/1994 | Dechene et al. | 324/307 |
| 5,302,897 | 4/1994 | Tache et al. | 324/307 |
| 5,319,308 | 6/1994 | Dechene et al. | 324/307 |
| 5,334,775 | 8/1994 | Gutierrez et al. | 568/791 |
| 5,367,260 | 11/1994 | Dechene et al. | 324/307 |
| 5,387,620 | 2/1995 | Park et al. | 521/143 |
| 5,408,017 | 4/1995 | Turner et al. | 526/134 |
| 5,408,181 | 4/1995 | Dechene et al. | 324/307 |
| 5,498,809 | 3/1996 | Emert et al. | 585/13 |
| 5,519,099 | 5/1996 | Wang et al. | 526/132 |
| 5,519,100 | 5/1996 | Ewin et al. | 526/134 |
| 5,519,319 | 5/1996 | Smith et al. | 324/306 |
| 5,521,265 | 5/1996 | Herwig et al. | 526/115 |
| 5,527,752 | 6/1996 | Reichle et al. | 502/117 |
| 5,527,868 | 6/1996 | Evertz et al. | 526/160 |
| 5,527,930 | 6/1996 | Sangokoya | 556/179 |
| 5,529,965 | 6/1996 | Chang | 502/110 |
| 5,529,966 | 6/1996 | Luciano et al. | 502/117 |
| 5,705,577 | 1/1998 | Rossi et al. | 526/68 |

OTHER PUBLICATIONS

G. Odian, Principles of Polymerization, John Wiley & Sons (3rd Ed. 1991).

M. Ohshima, S. Tomita, Model–Based and Neural–Net Based On–Line Quality Inference System for Polymerization Processes (abstract) AIChE (1995).

*Primary Examiner*—David W. Wu

[57] ABSTRACT

A process for continuously producing copolymer comprising moieties derived from ethylene and an α-olefin in the presence of a metallocene catalyst system, said process comprising continuously supplying into a liquid-phase reaction zone a feed of ethylene, a feed of liquefied α-olefin, a feed of diluent, a feed of metallocene catalyst system, and continuously drawing out a reactor effluent produced thereby; and in accordance with a procedure comprising (a) setting the rate of metallocene system feed to a fixed molar rate; (b) introducing said ethylene feed at a fixed rate as required to produce the desired molar quantity of copolymer product per unit time; (c) setting the total rate of all feeds and the volume of said liquid-phase reaction zone to a fixed residence time, said residence no less than the minimum required to substantially eliminate molecular ethylene from said effluent; (d) performing an isokathic adjustment of the ethylene/α-olefin ratio of said feeds so as to produce product containing the desired ratio of ethylene to α-olefin moieties; and (e) adjusting the reaction zone temperature so as to produce copolymer of the desired molecular weight. The process of the invention described herein is particularly suited to in-line analysis of molecular weight and composition by virtue of the relationship $$-\partial[E]/\partial t = [E_f]\tau^{-1}$$

wherein $-\partial[E]/\partial t$ is the total rate at which ethylene concentration vanishes from said reaction zone by reason of incorporation into said copolymer product, $[E_f]$ is the concentration of ethylene in the total feed, and $\tau^{-1}$ is the inverse of said residence time.

20 Claims, 1 Drawing Sheet

METHOD OF CONTROLLING CONTINUOUS ETHYLENE-LIMITED METALLOCENE-CATALYZED COPOLYMERIZATION SYSTEMS

BACKGROUND OF THE INVENTION

The present invention relates to a method of controlling metallocene-catalyzed continuous processes for the copolymerization of olefins in the solution-phase, that is to say systems that utilize diluent.

More particularly, this invention relates to continuous systems in which all ethylene entering the reactor vessel is consumed in the copolymerization reactions therein. Such systems are herein referred to as ethylene-limited copolymerizations because the flow of ethylene into the reactor is limiting to all reaction mechanisms that consume molecular ethylene.

DESCRIPTION OF THE RELATED ART

In continuous solution copolymerizations, the molecular weight and composition of the product can vary quite broadly, even unpredictably, depending on the reaction parameters, namely the concentration of the individual reactants in the total feed, the nature of the catalyst system employed, the catalyst concentration, the residence time, and the reaction temperature. In ethylene-limited systems as described herein, the relationship between the reaction parameters and the copolymer properties can even appear chaotic. Application of traditional theory can result in meaningless calculations, such as negative reaction rates. When the practitioner changes a reaction parameter in an attempt to alter a particular product property, he usually finds that multiple product properties are altered. The industry has generally avoided solution-phase copolymerizations in favor of gas phase and high pressure pure feed systems.

It is an object of this invention to provide a method for controlling the properties of ethylene/α-olefin produced by ethylene-limited continuous copolymerizations in the solution phase.

SUMMARY OF THE INVENTION

Disclosed herein is a method of controlling an ethylene-limited metallocene-catalyzed olefin copolymerization system. Such a system is characterized as a process for continuously producing copolymer of monomer moieties derived from ethylene and an α-olefin in the presence of a metallocene catalyst system and in a liquid-phase reaction zone by supplying a continuous monomer feed or feeds comprising ethylene, at least one α-olefin, a diluent, and a metallocene catalyst system into the liquid-phase reaction zone of a reactor under conditions effective in producing a copolymer product while continuously withdrawing the copolymer produced from the reactor. Such a system is further characterized in that the actual mechanical introduction of ethylene feed into the reaction zone is the rate-limiting step for all reactions within the reaction zone that consume ethylene. Ethylene-limited systems can be identified by the absence of ethylene in the reactor effluent.

The method of the present invention comprises (a) setting the rate of metallocene system feed to a fixed molar rate; (b) introducing said ethylene stream at a fixed rate as required to produce the desired molar quantity of copolymer product per unit time; (c) setting the total rate of all feeds and the volume of said liquid reaction zone to a fixed residence time, said residence no less than the minimum required to completely eliminate molecular ethylene from said effluent stream; (d) performing an isokathic adjustment of the ethylene/α-olefin ratio of said total feed streams so as to produce product containing the desired ratio of ethylene to α-olefin moieties; and (e) adjusting the reaction zone temperature so as to produce copolymer of the desired molecular weight.

DETAILED DESCRIPTION OF THE INVENTION

Figure 1:
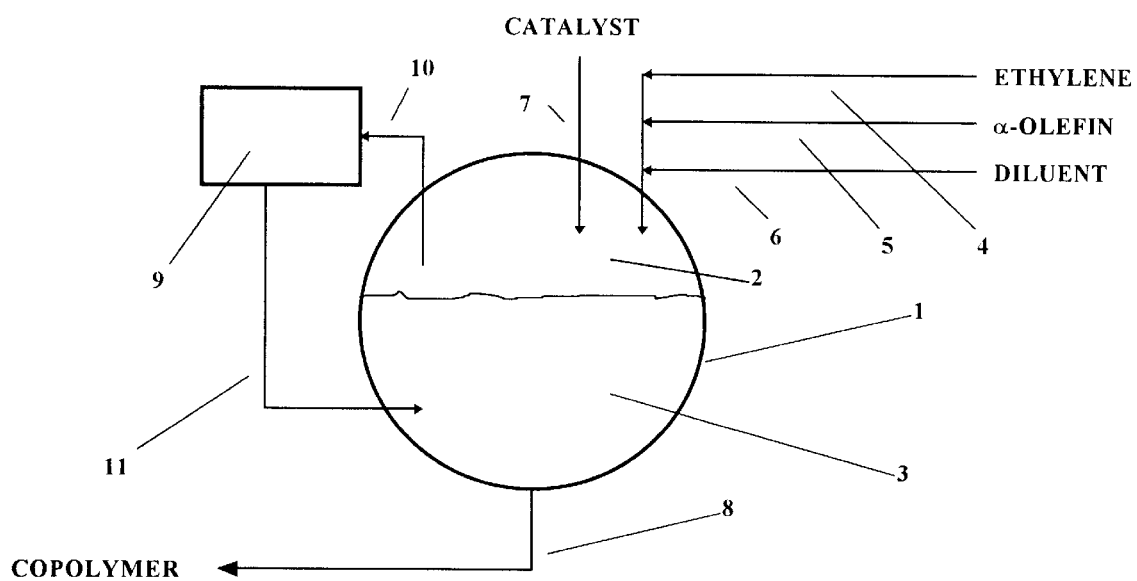
FIG. 1 is a diagram of a boiler reactor embodiment of the present invention.

Disclosed herein is a method of continuous production of copolymer comprising moieties derived from ethylene and an α-olefin in the presence of a metallocene catalyst system, said process comprising continuously supplying into a liquid-phase reaction zone a feed of ethylene, a feed of liquefied α-olefin, a feed of diluent, a feed of metallocene catalyst system, and continuously drawing out a reactor effluent produced thereby; and in accordance with a procedure comprising:

a) setting the rate of metallocene system feed to a fixed molar rate;

b) introducing said ethylene stream at a fixed rate as required to produce the desired molar quantity of copolymer product per unit time;

c) setting the total rate of all feeds and the volume of said liquid reaction zone to a fixed residence time, said residence no less than the minimum required to completely eliminate molecular ethylene from said effluent stream;

d) performing an isokathic adjustment of the ethylene/α-olefin ratio of said total feed streams so as to produce product containing the desired ratio of ethylene to α-olefin moieties; and e) adjusting the reaction zone temperature so as to produce copolymer of the desired molecular weight.

Traditional Theory

The traditional theory set forth herein is derived from Odian, *Principles of Polymerization*, John Wiley & Sons (3rd Ed. 1991), the relevant contents of which are incorporated herein by reference.

Copolymer Composition

The composition of a copolymer is always almost different than, though dependent upon, the composition of the reaction feed. In calculation fractions of monomers A and B in the final product, we follow the traditional approach in assuming four reaction mechanisms, each having a rate constant dependent upon the terminal moiety at the propagating end of the growing copolymer chain and upon the identity of the monomer:

|      | Reaction | Rate Constant |
|------|----------|---------------|
| (1a) | A* + A → A* | $k_{11}$ |
| (1b) | A* + B → B* | $k_{12}$ |
| (1c) | B* + A → A* | $k_{21}$ |
| (1d) | B* + B → B* | $k_{22}$ | where A and B are the monomers, A* and B* are growing copolymers whose propagating ends are active moieties of A and B respectively. The reactions are assumed to be irreversible.

The rates of disappearance of the monomers from the reaction mixture are given by:

$$-\partial[A]/\partial t = k_{11}[A^*][A] + k_{21}[B^*][A] \quad (2a)$$

$$-\partial[B]/\partial t = k_{12}[A^*][B] + k_{22}[B^*][B] \quad (2b)$$

A steady-state assumption is made that the rates of interconversion are equal:

$$k_{21}[B^*][A] = k_{12}[A^*][B] \quad (3)$$

and a pair of parameters $r_1$ and $r_2$ are defined, such that:

$$r_1 \equiv k_{11}/k_{12} \quad r_2 \equiv k_{22}/k_{21} \quad (4)$$

Dividing equations (2a) and (2b) and substituting (3) and (4) into the result obtains:

$$\Re = \partial[A]/\partial t[B] = [A](r_1[A]+[B])/[B]([A]+r_2[B]) \quad (5)$$

where $\Re$ is the molar ratio of the monomer moieties (i.e., the composition) of the final product, equal to the relative rates of incorporation of the two monomers. The equation can be rearranged in linear form as:

$$(\Re-1)[A][B] = r_1[A]^2 + r_2\Re[B]^2 \quad (6a)$$

or expressed as the mole fraction, $F_A$ or $F_B$, of monomer in the final product:

$$F_A = \frac{r_1[A]^2 + [A][B]}{r_1[A]^2 + 2[A][B] + r_2[B]^2} \quad (6b)$$

$$F_B = \frac{r_2[B]^2 + [A][B]}{r_1[A]^2 + 2[A][B] + r_2[B]^2}$$

By executing successive runs of the copolymerization reaction at constant temperature, the parameters $\Re$, [A], and [B] may be measured experimentally and the values $r_1$ and $r_2$ derived by linear regression or other statistical analysis. Several sets of such analysis executed at varying temperatures will permit experimental derivation of the temperature dependencies of $r_1$ and $r_2$ through an additional application of linear regressions using the equations:

$$ln(r_1) = ln(K_1) - E_1/RT \quad (7a)$$

$$ln(r_2) = ln(K_2) - E_2/RT \quad (7b)$$

where T is the absolute temperature in degrees Kelvin, R is the Universal Gas Constant, $E_1$ is the sum of the Arrhenius activation energies for equations (1a) and (1b), $E_2$ is the sum of the Arrhenius activation energies for equations (1c) and (1d), and $K_1$ and $K_2$ are constants. A regression analysis yields the E and K values as the slopes and intercepts, respectively.

Molecular Weight

The number average molecular weight, Mn, of a copolymer may be expressed as the ratio of the propagation rate, $R_p$, to the initiation rate, $R_i$, multiplied by the average molecular weight of the incorporated monomers. The propagation rate is the rate at which monomer moieties are added to the growing copolymer chain. The initiation rate is the rate at which copolymer growth is terminated. The ratio $R_p/R_i$ yields the degree of polymerization, Xn, from which the number average molecular weight is easily derived if the composition of the copolymer is known.

Initiation

The initiation rate is traditionally given by:

$$R_i = [A][I]k_{iA} + [B][I]k_{iB} \quad (9)$$

where [I] is the concentration of catalyst, or initiator, I. The equation represents the total sum of the rates at which the monomers join with catalyst to initiate new propagating chains. At equilibrium, the initiation rate is equal to the termination rate—the rate at which growing copolymer chains terminate their growth, either through side reactions or by the quench used to halt copolymerization in the effluent.

The degree of polymerization, Xn, is obtained by dividing the propagation rate by the initiation rate:

$$Xn = R_p/([A][I]k_{iA} + [B][I]k_{iB}) \quad (10)$$

The average number molecular weight is then given by:

$$Mn = MW_A F_A Xn + MW_B F_B Xn \quad (11)$$

where $MW_A$ and $MW_B$ are the molecular weights of each individual moiety of A and B, respectively.

Ethylene-Limited Theory

This invention relates to the special case of ethylene-limited copolymerizations, that is, copolymerizations in which all molecular ethylene entering the reaction zone is completely consumed in the process of copolymerization such that none survives to appear in the reactor effluent. Ethylene-limited continuous copolymerizations are therefore easily assayed by the absence of unreacted ethylene in the reactor effluent, that is to say that $[E_{out}]=0$, where $[E_{out}]$ is the concentration of ethylene in the reactor effluent. Of course, with sophisticated enough equipment, one may well detect insignificantly small quantities of molecular ethylene in the effluent, but this is not significant to the invention and, for the purposes of this invention, "absence" of ethylene in the effluent comprises a substantial absence of such ethylene. What is significant is that the rate-limiting step for all reaction mechanisms that consume molecular ethylene is the rate at which ethylene is actually introduced into the reaction zone. Reaction rates are traditionally reported in the rate of change of concentration of a reactant with respect to time. If, then, $[E_f]$ is the concentration of ethylene in moles/liter in the feed stream and $\Phi$ is the flow rate, or volumetric flux, of the feed stream in liters/second, then $[E_f]\Phi$ is the rate in moles/second that ethylene enters the reaction vessel. If the volume of the reaction zone is given to be V, then the rate of change per unit time of the ethylene concentration in the reaction zone attributable to the feed is given by:

$$-\partial[E]/\partial t = [E_f]\Phi/V = [E_f]\tau^{-1} \quad (12)$$

wherein $-\partial[E]/\partial t$ is the rate at which ethylene concentration vanishes from the reaction zone by reason of incorporation into copolymer product, $[E_f]$ is the concentration of ethylene with respect to the total of all said feeds, and $\tau^{-1}$ is the inverse of the residence time, $\tau$, which is defined as:

$$\text{residence time} = \tau = V/\Phi \qquad (13)$$

Note that the volume of the reaction zone, V, is not necessarily the volume of the reaction vessel since in most cases the reaction vessel is not completely filled. Metallocene catalysts do not vaporize, therefore no polymerization occurs in any vapor phase that may exist within the reaction vessel.

In the ethylene-limited continuous copolymerization, equation (12) is the rate-limiting step for all reactions within the reaction zone that consume ethylene. The "rate constant" for this step is the inverse of the residence time, $\tau^{-1}$.

It should be noted that when a feed concentration, such as $[E_f]$, is calculated, it is desirable to include all the solvents entering the reactor, even if not introduced through the same conduit as the ethylene. Note also that the $\alpha$-olefin comonomer is itself a solvent to ethylene and vice-versa.

Ethylene-Limited Copolymer Composition

The rates of initiation and propagation in the ethylene-limited case are given by:

| | Reaction | Rate | Rate Constant |
|---|---|---|---|
| (14) | $E + I \rightarrow E^*$ | $R_{IE} = \alpha[E_f]\tau^{-1}$ | $k_{IE} = \alpha\tau^{-1}$ |
| (15) | $B + I \rightarrow B^*$ | $R_{iB}$ | $k_{iB}$ |
| (16) | $E^* + E \rightarrow E^*$ | $R_{11} = \beta[E_f]\tau^{-1}$ | $k_{11} = \beta\tau^{-1}$ |
| (17) | $E^* + B \rightarrow B^*$ | $R_{12}$ | $k_{12}$ |
| (18) | $B^* + E \rightarrow E^*$ | $R_{21} = \gamma[E_f]\tau^{-1}$ | $k_{21} = \gamma\tau^{-1}$ |
| (19) | $B^* + B \rightarrow B^*$ | $R_{22}$ | $k_{22}$ |
| (20) | $B \rightarrow B_{out}$ | $R_{Bout} = [B]\tau^{-1}$ | $k_{Bout} = \tau^{-1}$ | where E represents ethylene, B represents the $\alpha$-olefin comonomer, [B] is the concentration of $\alpha$-olefin in the reaction zone, and $B_{out}$ is comonomer removed from the reaction zone. "Removal" of $\alpha$-olefin comonomer is effected by quenching the reactor effluent.

Since the feed rate of ethylene is the rate-limiting step for all ethylene-consumptive reactions, reactions (14), (16), and (18) are necessarily rate-limited such that, at equilibrium:

$$\alpha + \beta + \gamma = 1$$

There is no term to express the rate at which unreacted ethylene is carried out of the reaction zone as $E_{out}$ for the very good reason that if indeed the introduction of ethylene into the reaction is rate-limiting, then substantially no ethylene may survive to appear in the effluent.

It is suggested that the relative magnitudes of alpha, beta, and gamma are dependent upon the relative concentrations of catalyst, active ethylene-terminated copolymer chain, and active comonomer-terminated copolymer chain, respectively:

$$\alpha = k_{iE}[I]/(k_{iE}[I] + k_{11}[E^*] + k_{21}[B^*]) \qquad (21)$$

$$\beta = k_{11}[E^*]/(k_{iE}[I] + k_{11}[E^*] + k_{21}[B^*]) \qquad (22)$$

$$\gamma = K_{21}[B^*]/(k_{iE}[I] + k_{11}[E^*] + k_{21}[B^*]) \qquad (23)$$

Though measurement of $[E^*]$ and $[B^*]$ may be impractical, the equations do reveal that an equilibrium mechanism exists with respect to reactions (17) and (18)—the interconversion reactions—even in the ethylene-limited environment of the present invention. The reaction rates for equation (17) and (18) are therefore given by:

| | Reaction | Rate | Rate Constant |
|---|---|---|---|
| (14) | $E + I \rightarrow E^*$ | $R_{IE} = \alpha[E_f]\tau^{-1}$ | $k_{IE} = \alpha\tau^{-1}$ |
| (15) | $B + I \rightarrow B^*$ | $R_{iB}$ | $k_{iB}$ |
| (16) | $E^* + E \rightarrow E^*$ | $R_{11} = \beta[E_f]\tau^{-1}$ | $k_{11} = \beta\tau^{-1}$ |
| (17) | $E^* + B \rightarrow B^*$ | $R_{12} = \gamma[E_f]\tau^{-1}$ | $k_{12} = \gamma\tau^{-1} = k_{21}$ |
| (18) | $B^* + E \rightarrow E^*$ | $R_{21} = \gamma[E_f]\tau^{-1}$ | $k_{21} = \gamma\tau^{-1} = k_{12}$ |
| (19) | $B^* + B \rightarrow B^*$ | $R_{22}$ | $k_{22}$ |
| (20) | $B \rightarrow B_{out}$ | $R_{Bout} = [B]\tau^{-1}$ | $k_{Bout} = \tau^{-1}$ |

To complete the table, the reaction rates for comonomer chain initiation, $R_{iB}$, and for comonomer homopropagation, $R_{22}$, are inserted:

| | Reaction | Rate | Rate Constant |
|---|---|---|---|
| (14) | $E + I \rightarrow E^*$ | $R_{IE} = \alpha[E_f]\tau^{-1}$ | $k_{IE} = \alpha\tau^{-1}$ |
| (15) | $B + I \rightarrow B^*$ | $R_{iB} = [B][I]k_{iB}$ | $k_{iB}$ |
| (16) | $E^* + E \rightarrow E^*$ | $R_{11} = \beta[E_f]\tau^{-1}$ | $k_{11} = \beta\tau^{-1}$ |
| (17) | $E^* + B \rightarrow B^*$ | $R_{12} = \gamma[E_f]\tau^{-1}$ | $k_{12} = \gamma\tau^{-1} = k_{21}$ |
| (18) | $B^* + E \rightarrow E^*$ | $R_{21} = \gamma[E_f]\tau^{-1}$ | $k_{21} = \gamma\tau^{-1} = k_{12}$ |
| (19) | $B^* + B \rightarrow B^*$ | $R_{22} = [B][B^*]k_{22}$ | $k_{22}$ |
| (20) | $B \rightarrow B_{out}$ | $R_{Bout} = [B]\tau^{-1}$ | $k_{Bout} = \tau^{-1}$ |

The composition of the copolymer product may be expressed as the ratio of ethylene moieties to $\alpha$-olefin moieties:

$$\frac{-\partial[E]/\partial t}{-\partial[B]/\partial t} = \frac{\beta[E_f]\tau^{-1} + \gamma[E_f]\tau^{-1}}{\gamma[E_f]\tau^{-1} + [B][B^*]k_{22}} \qquad (24)$$

The degree of polymerization of the copolymer product may be expressed as the sum total of the polymerization rates divided by the sum total of the chain initiation rates:

$$X_n = \frac{R_p}{R_i} = \frac{\beta[E_f]\tau^{-1} + 2\gamma[E_f]\tau^{-1} + [B][B^*]k_{22}}{\alpha[E_f]\tau^{-1} + [B][I]k_{iB}} \qquad (25)$$

As can now be seen from equations (24) and (25), both the ethylene/$\alpha$-olefin composition and the molecular weight of the final product in ethylene-limited continuous copolymerizations are significantly affected by residence time and catalyst concentration. Residence time reveals its influence through its inverse term, $\tau^{-1}$, while catalyst concentration affects the relative values of $\alpha$, $\beta$, and $\gamma$. When performing ethylene-limited continuous copolymerizations, it is desirable that these parameters be fixed before attempting to adjust copolymer composition and molecular weight by manipulation of the feed composition and temperature, as described more fully below.

When performing the copolymerizations of the present invention, it is desirable that metallocene catalyst concentrations be kept as low as possible so as to reduce cost. The metallocene catalyst system is generally the most expensive input into the reactor and will be used sparingly until economies of scale bring the price of commercially available metallocene systems down. The difficulty in maintaining low catalyst concentrations is that low concentrations result in low molar output of copolymer product and high molecular weights, both of which are attributable to reduced rates of chain initiation. Where cost is a factor, the catalyst concentration should be kept as low as practical, but nevertheless high enough such that the average molecular weight of the copolymer product can be forced down to the desired target Mn by increasing the reaction temperature.

Since lowered catalyst feeds result in lowered molar output, the reduced number of moles of product produced per unit time must be compensated for by increasing the residence time. Residence time represents the time the reactants reside within the reaction zone and are actively involved in polymerization. Given a steady rate of chain initiation, $R_i$, at equilibrium, residence time is directly proportional to moles of product produced and therefore to copolymer concentration in the effluent for any given set of catalyst and reactant concentrations in the reaction zone. As indicated previously, residence time is given by the volume of the reaction zone divided by the volumetric flow rate of the feed or effluent. In taking measurements, the practitioner is advised to choose either the total feed or the effluent as the measure of flux for all calculations since the volumetric flux of the feed will generally not be identical to that of the effluent as the result of the density change brought about by the presence of copolymer chains in the effluent. It is preferred that the maximum practical volume within the reaction vessel be utilized for the reaction zone, since increasing residence time by lowering the feed rate will necessarily result in lowering of the effluent rate and therefore lowering of the product output rate per unit time, albeit at greater concentrations. The result is little or no change in molar output per unit time. Larger reactors make for greater economies of scale for this reason. Larger reactors (e.g., at least 400 liter, preferably at least 600 liter, capacity and higher) are preferred.

Economies of scale and production are steadily forcing down the costs of metallocene catalyst systems. Where cost is not an overriding factor, the practitioner of the present invention may set the metallocene feed to produce copolymer of the desired molecular weight and set the molar output of copolymer produced by manipulation of the residence time.

It is preferred that the ethylene feed rate be fixed for a desired rate of production. This is a matter of simple calculation. If it is desired to produce, for example, 10,000 moles per hour of a copolymer having on average 50 ethylene moieties per molecule, then the ethylene feed rate is calculated to be set at 500,000 moles per hour. Ethylene is the measure and control of the rate of production because the flow of ethylene into the reactor dictates copolymer production. Consider that the rate of ethylene incorporation vastly exceeds the rate of ethylene chain initiation by at least two orders of magnitude and it becomes immediately apparent that:

$$[E_f]\tau^{-1} \approx \beta[E_f]\tau^{-1} + \gamma[E_f]\tau^{-1} \qquad (26)$$

in other words:

$$\beta + \gamma \approx 1 \qquad (27)$$

Equation (24) could be approximated as:

$$\frac{-\partial[E]/\partial t}{-\partial[B]/\partial t} \approx \frac{[E_f]\tau^{-1}}{\gamma[E_f]\tau^{-1} + [B][B^*]k_{22}} \qquad (24b)$$

with minimal error.

When the ethylene feed concentration, catalyst concentration and residence time are set, the rate of polymerization of ethylene is essentially "locked" at about $[E_f]\tau^{-1}$ and the practitioner may then adjust the α-olefin concentration to manipulate the copolymer composition at leisure. This is one of the advantages of an ethylene-limited system. Without ethylene-limitation, any change in the α-olefin concentration causes ripple effects throughout the reaction zone, affecting ethylene incorporation as well as α-olefin incorporation rates.

Once the catalyst feed rate, ethylene feed rate, and residence time have been selected and fixed, the practitioner may then adjust the copolymer composition by isokathic adjustment of the feed composition. By "isokathic" is meant that the feed composition is altered in a manner that keeps the residence time, τ, unchanged. Hence, for example, if the α-olefin feed rate is increased, it would be necessary to decrease the diluent feed rate, the ethylene feed rate, or both such that the residence time, τ, after adjustment is equal to that before adjustment. Residence time may also be maintained by altering the reaction zone volume (and such is included in the term "isokathic"), but this is not preferred. Generally the residence time after feed composition adjustment should be kept to within no more than 20% of its pre-adjustment value, preferably 10%, and more preferably 1%. Mechanical or electromechanical valve means for maintaining the residence time are preferred.

This invention relates solely to ethylene-limited copolymerizations. If after adjustment of the feed composition it is found that anything more than trace ethylene appears in the reactor effluent, then it will be necessary to go back and make adjustment to ethylene feed rate, catalyst feed rate, or residence time so as to cause ethylene to substantially vanish from the effluent and proceed through the adjustment steps all over again.

Once the composition of the product has been set by adjustment of the composition of the feed, it comes time to "fine tune" the number average molecular weight, Mn. This is best achieved by adjustment of the reaction temperature. Higher temperatures result in lower average molecular weights and vice versa. In metallocene-catalyzed copolymerizations, temperature has a much greater impact upon molecular weight than upon copolymer composition. On the other hand, it will generally be found that altering the feed composition will significantly alter molecular weight. Therefore, thermal adjustment of molecular weight is a step taken only after the copolymer composition is adjusted by manipulation of the feed composition. One great advantage of metallocene-catalyzed copolymerizations is that they are almost always exothermic, so the heat required to raise reaction temperature is almost free except for the cost of carrying excess heat away.

In any particular copolymerization run, the practitioner may find that the practical temperature range available to him is insufficient to adjust the molecular weight of the product to the desired molecular weight. In such cases, it will be necessary to go back to the first step of the method of this invention, select a new catalyst concentration, and proceed again through the steps of adjusting residence time, feed composition, and temperature control of molecular weight.

The invention disclosed herein works best when the practitioner can obtain rapid information regarding the average number molecular weight and composition of the copolymer product as it comes out of the reactor, otherwise use of the method could take weeks, if not days, wherein most of the time needed spent waiting for laboratory results. Unfortunately, there is at present no means of determining copolymer composition instantaneously, but a number of methods yield rapid, if not instantaneous, information. A preferred method is a continuous fractionator and gel permeation chromatograph (GPC) as disclosed in U.S. Pat. No. 4,992,168, entitled "Apparatus for Fractionally Measuring Polymers," the disclosures of which are incorporated herein in their entirety. Most preferred is a continuous Nuclear Magnetic Resonance analyzer, (hereinafter, Dechene Analyzer), adapted for the purpose of measuring the ethylene content and average number molecular weight of the copolymer product. Such a device is disclosed in U.S. Pat. Nos. 5,015,954; 5,049,819; 5,302,896; 5,302,897; 5,319,308; 5,367,260; 5,408,181; and 5,519,319, the disclosures of which are incorporated hereinion their entirety. It is preferred that analysis take place after the reactor effluent has been quenched and purified (but before stripping) so as to present to the analyzer as clean a sample as possible. A Dechene Analyzer and continuous fractionator or GPC may both be utilized concurrently. Other methods and apparatus for continuously measuring the properties of the reactor effluent are known in the art. It is known, for example, to measure number average molecular weight and copolymer composition indirectly by measuring a copolymer's physical properties, such as viscosity, melt index, and the like, though these methods are less preferred.

Also known are neural network feedback systems that compensate for the delay in obtaining measurements of the properties of the copolymer product. An interesting application to polyethylene polymerization, entitled "Model Based and Neural-Net Based On-Line Quality Inference System for Polymerization Processes," by M. Ohshima and S. Tomita is available from the American Institute of Chemical Engineers and an abstract thereof can be found at the URL address http://www.che.ufl.edu/aiche/annual_meeting/1995/session/181/e/ on the World Wide Web.

Continuous analysis of the reaction output is typically referred to as "in-line" analysis in the art. An extra bonus of using ethylene-limited copolymerizations is that in-line analysis of copolymer composition is facilitated by knowing exactly how much ethylene is incorporated into the copolymer product—namely, all of it. Recall also that metallaocene catalysis yields a product having exactly one carbon-carbon double bond per molecule, thereby facilitating in-line monitoring of the number of moles of copolymer produced. Knowing the total ethylene incorporated and detecting the total molecules produced, it is a simple matter to calculate the average number of ethylene moieties per molecule and then derive the average number of α-olefin moieties per molecule in-line. Ethylene-limited reactions of the present invention are therefore much better suited to in-line analysis than traditional copolymerization processes.

The theory behind gel permeation chromatography (GPC), also known as size exclusion chromatography, may be found in W. W. Yau, J. J. Kirkland and D. D. Bly, "Modern Size Exclusion Liquid Chromatography", John Wiley & Sons, New York (1979).

The Monomers

Copolymers produced by the method of the present invention are copolymers comprising monomer moieties derived from ethylene and at least one α-olefin. Such monomers are characterized by the presence within their structure of at least one ethylenically unsaturated group of the structure >C=CH$_2$. They are highly reactive at low catalyst concentrations. Metallocene-catalyzed polymerizations are particularly effective with α-olefin monomers that:

a) have at least one hydrogen on the 2-carbon;
b) have at least two hydrogens on the 3-carbon; and
c) have at least one hydrogen on the 4-carbon.

Accordingly, suitable α-olefin monomers include those represented by the structural formula H$_2$C=CH—R wherein R is straight chain or branched chain alkyl radical comprising 1 to 18 carbon atoms and wherein the copolymer formed therefrom contains a high degree of terminal ethenylidene unsaturation. Preferably R in the above formula is an alkyl of from 1 to 8 carbon atoms, and more preferably is an alkyl of from 1 to 2 carbon atoms. Therefore, useful comonomers with ethylene include propylene, butene-1, pentene-1, 4-methylpentene-1, hexene-1, octene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and butene-1, and the like).

The process of the present invention utilizes a metallocene catalyst system. Such metallocenes are extremely unreactive with non-terminal olefins, and terminal olefins that lack at least one hydrogen atom on the second carbon (e.g., isobutylene), at least two hydrogens on the third carbon (e.g., isopentene), or at least one hydrogen on the fourth carbon (e.g., 4,4-dimethylpentene-1).

Many of the components in refinery streams, such as Raffinate-2, are non-reactive in a metallocene system and act as diluents for use in the present process and may therefore be used directly as the α-olefin feed with minimal pretreatment. Raffinate-2 contains high concentrations of butene-1 and is relatively inexpensive. Trace components such as butadiene may be rendered non-reactive by saturating the double bonds with hydrogen under pressure.

The Copolymer Product

The ethylene/α-olefin copolymers of the present invention are characterized in that they may have an ethylene content of anywhere between 0% and 100%. Since the rate of ethylene incorporation is limited by $[E_f]\tau^{-1}$, the practitioner has control over the ethylene content that is unknown in traditional copolymerization systems—the α-olefin content of the product may be increased by boosting the α-olefin in the feed without causing the corresponding increase in the rate of ethylene incorporation that affects non-ethylene-limited processes. In general, the ethylene content of the copolymers prepared in accordance with this invention is preferably in the range of between about 5 and about 75 wt %, and more preferably between about 10 and about 50 wt %. Techniques for determining copolymer composition include radioisotopic labeling and infrared, ultraviolet, and NMR spectroscopy. Copolymer microstructure may be analyzed by $^{13}$C NMR spectroscopy where desired.

The process of the present invention is controlled to make copolymer having a number average molecular weight of not greater than about 30,000 and typically from about 300 to about 15,000, preferably from about 500 to about 10,000; more preferably from about 1,000 to about 5,000. Molecular weights above 30,000 will require special handling, the specifics of which are more concerned with the mechanical design of the reactor system than with the teachings of the invention herein, except to the extent that the practitioner will find the need to use greater quantities of diluent and to operate at higher temperatures to maintain fluidity of the reaction mixture and effluent where increasing higher molecular weight product is formed.

The copolymers produced in this invention are further characterized in that up to about 95% or more of the copolymer chains possess terminal ethenylidene-type unsaturation. Thus, one end of such copolymers will be of the formula CHAIN—C(T$^1$)=CH$_2$ wherein T$^1$ is C$_1$ to C$_{18}$ alkyl, preferably $C_1$ to $C_8$ alkyl, and more preferably $C_1$ to $C_2$ alkyl, (e.g., methyl or ethyl) and wherein CHAIN represents the copolymer chain. The chain length of the $T^1$ alkyl group will vary depending on the comonomer(s) selected for use in the copolymerization. A minor amount of the copolymer chains can contain terminal vinyl unsaturation, i.e. CHAIN—CH=$CH_2$, and a portion of the copolymers can contain internal monounsaturation, e.g. CHAIN—C($T^1$) =CH($T^2$), wherein $T^1$ and $T^2$ are as defined for $T^1$ above. The percentage of copolymer chains exhibiting terminal ethenylidene unsaturation may be determined by FTIR spectroscopic analysis, titration, HNMR, or $C^{13}$NMR.

The molecular weight distribution (MWD=Mw/Mn) of the copolymers will be typically less than about 5, preferably less than about 4, and most preferably less than about 3. The MWD is primarily dependent upon the metallocene catalyst system utilized rather than upon any of the control parameters disclosed herein. As a general rule, one can expect an MWD of between 1.5 and 2.5 when using metallocene catalysts. It is anticipated that the practitioner of the present invention will control MWD primarily through the selection of the metallocene catalyst system and stripping.

Preferred α-olefin monomers are those derived from dilute α-olefin containing refinery streams, such as Raffinate-2, namely butene-1 and propylene. These copolymers have many uses known in the art, particularly in the production of fuel and lubricant additives such as viscosity modifiers and dispersants. Since metallocene copolymers generally exhibit a high degree of terminal unsaturation, they are easily functionalized as disclosed in U.S. Pat. No. 5,334,775 (hydroxyaromatic alkylation) and U.S. Pat. No. 4,354,950 (Mannich Base functionalization), the disclosures of which are incorporated herein by reference. The specific advantages of ethylene/butene-1 copolymers may be found in U.S. Pat. No. 5,498,809, the disclosures of which are hereby incorporated herein by reference.

The Catalyst System

The catalysts employed in the production of the reactant copolymers are organometallic coordination compounds which are cyclopentadienyl derivatives of a Group 4 metal of the Periodic Table of the Elements (IUPAC convention) and include mono, di and tricyclopentadienyls and their derivatives of the transition metals. Particularly desirable are the metallocene of a Group 4 metal such as titanium, zirconium, and hafnium. The aluminoxanes employed in forming the reaction product with the metallocenes are themselves the reaction products of an aluminum trialkyl with water.

The Metallocene Component

In general, at least one metallocene compound is employed in the formation of the catalyst. Metallocene is a metal derivative of a cyclopentadiene. The metallocenes usefully employed in accordance with this invention contain at least one cyclopentadiene ring. The metal is selected from the Group 4 preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred. The monocyclopentadienyl transition metal ethylenic polymerization catalysts taught in U.S.

Pat. No. 5,026,798, and U.S. Pat. No. 5,408,017, the teachings of which are incorporated herein by reference, are also suitable for use in preparing the copolymers of the present invention.

Useful metallocenes can be represented by the general formulas:

$$(Cp)_m MR_n X_q \qquad \text{I.}$$

wherein Cp is a cyclopentadienyl ring, M is a Group 4 transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3, $$(C_5R'_k)_g R''_s (C_5R'_k) MQ_{3-g} \qquad \text{II.}$$

and $$R''_s (C_5R'_k)_2 MQ' \qquad \text{III.}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a C(4-$C)_6$ ring, R" is a $C_1$–$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis (cyclopentadienyl)titanium diphenyl, bis(cyclopentadienyl) zirconium dimethyl, bis(cyclopentadienyl)zirconium diphenyl, bis(cyclopentadienyl)hafnium dimethyl and diphenyl, bis(cyclopentadienyl)titanium di-neopentyl, bis (cyclopentadienyl)zirconium di-neopentyl, bis (cyclopentadienyl)titanium dibenzyl, bis(cyclopentadienyl) zirconium dibenzyl, bis(cyclopentadienyl)vanadium dimethyl; the mono alkyl metallocenes such as bis (cyclopentadienyl)titanium methyl chloride, bis (cyclopentadienyl)titanium ethyl chloride bis (cyclopentadlenyl)titanium phenyl chloride, bis (cyclopentadlenyl)zirconium hydrochloride, bis (cyclopentadienyl)zirconium methyl chloride, bis (cyclopentadienyl)zirconium ethyl chloride, bis (cyclopentadienyl)zirconium phenyl chloride, bis (cyclopentadienyl)titanium methyl bromide, bis (cyclopentadienyl)titanium methyl iodide, bis (cyclopentadienyl)titanium ethyl bromide, bis (cyclopentadienyl)titanium ethyl iodide, bis (cyclopentadienyl)titanium phenyl bromide, bis (cyclopentadienyl)titanium phenyl iodide, bis (cyclopentadienyl)zirconium methyl bromide, bis (cyclopentadienyl)zirconium methyl iodide, bis (cyclopentadienyl)zirconium ethyl bromide, bis (cyclopentadienyl)zirconium ethyl iodide, bis (cyclopentadienyl)zirconium phenyl bromide, bis (cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafinium trimethyl.

Illustrative, but non-limiting examples of formulae II and III metallocenes which can be usefully employed are mono-cyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2 \cdot Al(CH_3)_3$, $(Cp_2TiCH_2)_2$, $Cp_2TiCH_2CH(CH_3)CH_2$, $Cp2TiCH_2 CH_2CH_2$; substituted bis(Cp)Ti(IV) compounds such as bis(indenyl)titanium diphenyl or dichloride, bis (methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other such complexes; pentamethylcyclopentadienyl zirconium trichloride, pentaethylcyclopentadienyl zirconium trichloride, the alkyl substituted cyclopentadienes, such as bis (ethylcyclopentadienyl)zirconium dimethyl, bis(beta-phenylpropylcyclopentadienyl)zirconium dimethyl, bis (methylcyclopentadienyl)zirconium dimethyl, bis(n-butylcyclopentadienyl)zirconium dimethyl, bis (cyclohexylmethylcyclopentadienyl)zirconium dimethyl, bis(n-octyl-cyclopentadienyl)zirconium dimethyl, and haloalkyl and dihydride, and dihalide complexes of the above; dialkyl, trialkyl, tetraalkyl, and penta-alkyl cyclopentadienes, such as bis(pentamethylcyclopentadienyl )zirconium diphenyl, bis(pentamethylcyclopentadienyl) zirconium dimethyl, bis(1,2-dimethylcyclopentadienyl) zirconium dimethyl and mono and dihalide and hydride complexes of the above; silicon, phosphorus, and carbon bridged cyclopentadiene complexes such as dimethylsilyl-dicyclopentadienyl zirconium dimethyl, methyl halide or dihalide, and methylene dicyclopentadienyl zirconium dimethyl, methyl halide, or dihalide. Mono, di, and tri-silylsubstituted cyclopentadienyl compounds such as bis (trimethylsilylcyclopentadienyl)zirconium dichloride and dimethyl, bis(1,3-di-trimethylsilylcyclopentadienyl) zirconium dichloride and dimethyl, and bis(1,2,4-tri-trimethylsilylcyclopentadienyl)zirconium dichloride and dimethyl. Carbenes represented by the formulae $Cp_2Zr=CH_2P(C_6H_5)_2CH_3$, and derivatives of these compounds such as $Cp_2ZrCH_2CH(CH_3)CH_2$.

Also useful are mixed cyclopentadienyl metallocene compounds such as cyclopentadienyl(pentamethylcyclopentadienyl)zirconium dichloride, (1,3-ditrimethylsilylcyclopentadienyl)(pentamethylcyclopentadienyl)zirconium dichloride, and cyclopentadienyl(indenyl)zirconium dichloride can be employed.

Also employable in the present invention are bis (cyclopentadienyl)hafnium dichloride, bis (cyclopentadienyl)hafnium; dimethyl, bis(cyclopentadienyl) vanadium dichloride and the like are illustrative of other metallocenes, bis(cyclopentadienyl)zirconium; dimethyl, bis(cyclopentadienyl)zirconium dichloride; bis (cyclopentadienyl)titanium dichloride; bis (methylcyclopentadienyl)zirconium dichloride; bis (methylcyclopentadienyl)titanium dichloride; bis(n-butylcyclopentadienyl)zirconium dichloride; dimethylsilyldicyclopentadienyl zirconium dichloride; bis (trimethylsilycyclopentadienyl)zirconium dichloride; and dimethylsilyldicyclopentadienyl titanium dichloride; bis (indenyl)zirconium dichloride; bis(4,5,6,7-tetrahydroindenyl )zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis (methylcyclopentadienyl)zirconium dichloride.

Also suitable for use in the present invention are the class of metallocenes alternatively referred to as "constrained geometry catalysts" as disclosed in U.S. Pat. No. 5,132,380 and U.S. Pat. No. 5,387,620 the teachings of which are incorporated herein by reference.

Constrained-geometry catalysts useful in making the ethylenic copolymer comprise a metal complex and a cocatalyst. Constrained-geometry metal complexes correspond to the Formula (IV):

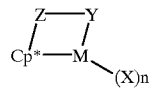

wherein M is selected from the group consisting of groups 3–10 or the Lanthanide series of the Periodic Table of the Elements; Cp* is selected from the group consisting of indenyl, tetrahydroindenyl, fluorenyl, octahydrofluorenyl, tetrahydrofluorenyl, cyclopentadienyl, and R-substituted cyclopentadienyl bound in an $\eta^5$ bonding mode to M; X is, independently for each occurrence, an anionic ligand group selected from the group consisting of hydride, halide, alkyl of up to 30 carbon atoms, alkoxy having up to a total of 30 carbon and oxygen atoms, cyanide, azide, acetylacetonate, aryl of up to 30 carbon atoms, aryloxy having up to a total of 30 carbon and oxygen atoms, norbornyl, and benzyl; n is 0, 1, 2, 3, or 4 and is 2 less than the valence of M; Y is NR", PR", 0, or S; Z is $CR_2^*$, $CR_2^*CR_2^*$, $SIR_2^*$, $SiR_2^*SiR_2^*$; R is selected from the group consisting of alkyl having 1 to 20 carbon atoms, cyano, norbornyl, benzyl, aryl of up to 20 carbon atoms, $(R')_3Si$, and $(R')_3Ge$; R' is selected from the group consisting of $C_1$–$C_{20}$ alkyl and aryl of up to 20 carbon atoms; R" is selected from the group consisting of $C_1$–$C_{20}$ alkyl, aryl of up to 20 carbon atoms, benzyl, haloaryl having up to a total of 20 carbon and halogen atoms, 2-methoxyphenyl, 4-methoxyphenyl, and norbornyl; and R* is selected from the group consisting of hydrogen, $C_1$–$C_{20}$ alkyl, haloalkyl having up to a total of 20 carbon and halogen atoms, aryl of up to 20 carbon atoms, and haloaryl of up to a total of 20 carbon and halogen atoms.

Preferred metal complexes are those of Formula (IV) wherein M is titanium, zirconium, or hafnium; X is, independently each occurrence, selected from the group consisting of halide, alkyl of up to 30 carbon atoms, aryl of up to 30 carbon atoms, and benzyl; n is 1 or 2; Y is NR"; Z is $CR_2*CR_2*$ or $SIR_2*$; R is selected from the group consisting of alkyl having 1 to 20 carbon atoms, benzyl, aryl of up to 20 carbon atoms, and $(R')_3Si$; R' is selected from the group consisting of $C_1$–$C_{20}$ alkyl and aryl of up to 20 carbon atoms; R" is selected from the group consisting of $C_1$–$C_{20}$ alkyl, aryl of up to 20 carbon atoms, and benzyl; and R* is selected from the group consisting of hydrogen, $C_1$–$C_{20}$ alkyl, and aryl of up to 20 carbon atoms.

It should be noted that the complex may exist as a dimer or higher oligomer. Further preferably, at least one of R, Z, or R" is an electron donating moiety. Thus, highly preferably Y is a nitrogen or phosphorus containing group corresponding to the formula —NR"— or —PR"—wherein R" is $C_1$–$C_{20}$ alkyl, i.e., an alkyl amido or alkyl phosphido group. Most highly preferred complex compounds are amidosilane- or amidoalkanediyl-compounds corresponding to Formula (V):

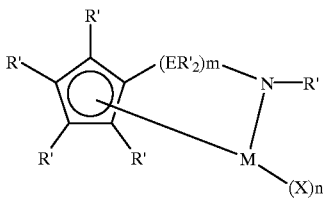

wherein M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof, said R' having up to 10 carbon or silicon atoms; E is silicon or carbon; X independently each occurrence is hydride, halo, alkyl, aryl, aryloxy or alkoxy, said X having up to 10 carbons; m is 1 or 2; and n is 1 or 2.

Preferred examples of the above metal coordination compounds include compounds wherein the R' on the amido group is methyl, ethyl, propyl, butyl, pentyl, hexyl, (including isomers), norbornyl, benzyl or phenyl; the cyclopentadienyl group is cyclopentadienyl, indenyl, tetrahydroindenyl fluorenyl, or octahydrofluorenyl; R' on the foregoing cyclopentadienyl groups each occurrence is hydrogen, methyl, ethyl, propyl, butyl, pentyl, hexyl, (including isomers), norbornyl, benzyl, or phenyl; and X is chloro, bromo, iodo, methyl, ethyl, propyl, butyl, pentyl, hexyl, (including isomers), norbornyl, benzyl, or phenyl.

Specific compounds include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)-methylenetitanium dichloro, (tertbutylamido)dibenzyl (tetramethyl-$\eta^5$-cyclopentadienyl) silanezirconium dibenzyl, (benzylamido)dimethyl-(tetramethyl-$\eta^5$-cyclopentadienyl)silanetitanium dichloride, (phenylphosphido)dimethyl(tetramethyl-$\eta^5$-cyclopentadienyl)silanezirconium dibenzyl, (tertbutylamido)dimethyl(tetramethyl-$\eta^5$-cyclopentadienyl) silanetitanium dimethyl, and the like.

The complexes may be prepared by contacting a derivative of a metal, M, and a group I metal derivative or Grignard derivative of the cyclopentadienyl compound in a solvent and separating the salt byproduct. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is $MX_{n+1}$, i.e., M is in a lower oxidation state than in the corresponding compound, $MX_{n+2}$ and the oxidation state of M in the desired final complex. A noninterfering oxidizing agent may thereafter be employed to raise the oxidation state of the metal. The oxidation is accomplished merely by contacting the reactants utilizing solvents and reaction conditions use in the preparation of the complex itself. By the term "noninterfering oxidizing agent" is meant a compound having an oxidation potential sufficient to raise the metal oxidation state without interfering with the desired complex formation or subsequent copolymerization processes. A particularly suitable noninterfering oxidizing agent is AgCl or an organic halide such as methylene chloride.

The Activator Component

Suitable cocatalysts, or activators, for use in the present invention include polymeric or oligomeric aluminoxanes. Aluminoxane compounds useful in the copolymerization process may be cyclic or linear. Cyclic aluminoxanes may be represented by the general formula $(R—Al—O)_n$ while linear aluminoxanes may be represented by the general formula $R(R—Al—O)n'AlR_2$. In general formula R is a $C_1$–$C_5$ alkyl group such as, for example, methyl, ethyl, propyl, butyl and pentyl, n is an integer of from 3 to 20, and n' is an integer from 1 to about 20. Preferably, R is methyl and n and n' are 4 to 18. Generally, in the preparation of aluminoxanes from, for example, aluminum trimethyl and water, a mixture of the linear and cyclic compounds is obtained.

The aluminoxanes can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the aluminoxane is prepared in the presence of a hydrated ferrous sulfate. The method comprises treating a dilute solution of aluminum trimethyl in, for example, toluene, with ferrous sulfate represented by the general formula $FeSO_4.7H_2O$. The ratio of ferrous sulfate to aluminum trimethyl is desirably about 1 mole of ferrous sulfate for 6 to 7 moles of aluminum trimethyl. The reaction is evidenced by the evolution of methane. Aluminoxanes can also be made as disclosed in U.S. Pat. Nos. 5,527,930, 4,542,199, 4,544,762, 5,015,749, and 5,041,585, the disclosures of which are incorporated herein by reference. Preferred cocatalysts are inert, noncoordinating, boron compounds.

The mole ratio of aluminum in the aluminoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

Compounds useful as activators will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Groups 3 to 10 or Lanthanide Series cation) which is formed when the two components are combined and sufficiently labile to be displaced by ethylenicic, diethylenicic and acetylenically unsaturated substrates or other neutral Lewis bases such as ethers, nitrites and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

A preferable activator useful in the preparation of metallocene catalyst systems may be represented by the following general formula:

$$(L-H)^+[A]^-$$

wherein L is a neutral Lewis base; $(L-H)^+$ is a Bronsted acid; and $[A]^-$ is a compatible, noncoordinating anion.

More preferably $[A]^-$ corresponds to the formula:

$$[M'Q_q]^-$$

wherein M' is a metal or metalloid selected from Groups 5 to 15 of the Periodic Table of the Elements; Q, independently for each occurrence, is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide; and q is one more than the valence of M'.

Activators comprising boron which are particularly useful in the preparation of metallocene catalyst systems may be represented by the following general formula:

$$[L-H]^+[BQ_4]^-$$

wherein L is a neutral Lewis base; $[L-H]^+$ is a Bronsted acid; B is boron in a valence state of 3; and Q is as previously defined.

Illustrative, but not limiting, examples of boron compounds which may be used as activators are trialkyl-substituted ammonium salts such as triethylammonium tetraphenylborate, tripropylamrnonium tetraphenylborate, tris(n-butyl)ammonium tetraphenylborate, trimethylammonium tetrakis(p-tolyl)borate, tributylammonium tetrakis(pentafluorophenyl)borate, tripropylammonium tetrakis(2,4-dimethylphenyl)borate, tributylammonium tetrakis(3,5-dimethyphenyl)borate, triethylammonium tetrakis(3,5-di-trifluoromethylphenyl)borate and the like. Also suitable are N,N-dialkyl anilinium salts such as N,N-dimethylaniliniumtetraphenylborate, N,N-diethylanilinium tetraphenylborate, N,N-dimethyl-2,4,6-trimethylanilinium tetraphenylborate and the like; dialkylammonium salts such as di-(i-propyl)ammonium tetrakis(pentafluorophenyl) borate, dicyclohexylammonium tetraphenylborate and the like; and triaryl phosphonium salts such as triphenylphosphonium tetraphenylborate, tri(ethylphenyl)phosphonium tetrakispentafluorophenylborate, tri(dimethylphenyl) phosphonium tetraphenylborate and the like.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

The catalyst systems described herein are suitable for the copolymerization of olefins in solution over a wide range of pressures. Preferably, the copolymerization will be completed at a pressure of from about 1 to about 10 atmospheres, and generally at a pressure within the range from about 1 to about 5 atmospheres, and most preferably, the copolymerization will be completed at a pressure within the range from about 1 to about 2 atmospheres.

A metallocene-aluminoxane olefin copolymerization catalyst may alternatively be produced as a reaction product in accord with that taught by Turner in U.S. Pat. No. 4,752,597, assigned to Exxon Chemical Patents Inc. wherein it is disclosed that a solid reaction product is obtained by reacting at least one metallocene of a metal of Group 4 of the Periodic Table with an aluminoxane at a ratio of 1:12 to about 1:100 on a molar basis based on the metal and aluminum.

Ooptional Systems

The catalyst systems described above may optionally be supported in accordance with that taught in U.S. Pat. No. 5,057,475, U.S. Pat. No. 5,017,714, and U.S. Pat. No. 5,529,965, the disclosures of which are incorporated herein by reference, or otherwise and introduced into the reactor as a slurry.

The catalyst systems may also be used with a scavenging component such as an organoaluminum or alkyl aluminum reagent to increase activity as described in the art. Scavenging components for use with metallocene-aluminoxane catalyst systems are well known in the art. Specific teachings directed to bis(cyclopentadienyl) ionic activated systems can be found in U.S. Pat. No. 5,153,157.

Metallocene systems as disclosed in U.S. Pat. Nos. 5,527,868; 5,527,752; 5,521,265; 5,519,100; 5,519,099; 5,529,966; and 5,527,930, the disclosures of which are incorporated herein by reference, are also useful in the process of the present invention.

In general, any metallocene system that is useful in the copolymerization of olefins may be utilized in the present invention. The disclosures of all art cited are incorporated herein by reference in their entirety.

The Reactor

The process of the present invention is preferably carried out in a boiler reactor with reflux. Shown in FIG. 1 is a reactor vessel 1 having therein a liquid phase reaction zone 3 and a vapor phase 2. Conduits 4, 5, 6, and 7 introduce ethylene, α-olefin, diluent, and catalyst feeds respectively into the reaction vessel. A conduit 8 connecting at or near the bottom of the reactor vessel carries the effluent containing the copolymer product out of and away from the reactor for quenching. A reflux system 9 continuously draws vapor out from the top of the reactor vessel through a conduit 10, cools the vapor, and returns the resulting liquid condensate back to the liquid reaction zone of the reaction vessel through a return conduit 11. It is preferred that a system for continuously mixing the reaction mixture be implemented, usually in the form of one or more rotating blades (not shown) within the liquid phase of the reactor.

Non-boiler reactors may also be used, but these are generally useful for small scale copolymerizations. The advantage of the reflux boiler reactor system is homogeneity of temperature throughout the reaction zone as the result of the efficiencies of evaporative cooling. Reflux systems may be internal or external.

Copolymerization is generally conducted at temperatures ranging between about 20 deg. C. and about 300 deg. C., preferably between about 30 deg. C., and about 200 deg. C. The residence time must be sufficient to remove ethylene from the effluent and may vary from several hours or more to several minutes or less, depending upon catalyst and reactant concentrations.

Quenching is generally performed by mixing the reactor effluent with water, an aqueous solution of base, such as sodium hydroxide, or ammonia. The quench marks the end of the reaction zone, which actually extends into the effluent conduit insofar as polymerization continues to take place therein. Purification is generally achieved by first separating out the aqueous quench—which then has the deactivated metallocene catalyst dissolved therein—and then distilling and/or fractionating out the diluents and unreacted α-olefin. The copolymer product is usually then passed through a stripper to strip off the low molecular weight fragments and then deposited in a storage container or loaded directly onto a tanker truck. Since stripping raises the number average molecular weight and lowers the molecular weight distribution of the copolymer product, it is preferred that analysis of the copolymer product occur before this step so as not to confuse variances in the properties of the copolymer product with changes in stripper parameters instead of reaction parameters. More preferably, analysis of the product is performed both before and after the stripping process so as to also obtain accurate knowledge of the product as distributed and sold.

Changes and modifications can be made by those skilled in the art to the embodiments as disclosed herein and such examples, illustrations, and theories are for explanatory purposes and are not intended to limit the scope of the claims.

What is claimed is:

1. A process for continuously producing copolymer by copolymerizing ethylene and an α-olefin in the presence of a metallocene catalyst system, said process comprising continuously supplying into a liquid-phase reaction zone a feed of ethylene, a feed of liquefied α-olefin, a feed of diluent, a feed of metallocene catalyst system, and continuously drawing out a reactor effluent produced thereby; and in accordance with a procedure comprising:
   a) setting the rate of metallocene system feed to a fixed molar rate;
   b) introducing said ethylene feed at a fixed rate as required to produce the desired molar quantity of copolymer product per unit time;
   c) setting the total rate of all feeds and the volume of said liquid-phase reaction zone to a fixed residence time, said residence no less than the minimum required to substantially eliminate molecular ethylene from said effluent,
   d) performing an isokathic adjustment of the ethylene/α-olefin ratio of said feeds so as to produce product containing the desired ratio of ethylene to α-olefin moieties; and
   e) adjusting the reaction zone temperature so as to produce copolymer of the desired molecular weight.

2. The process of claim I wherein the α-olefin is propene.

3. The process of claim I wherein the α-olefin is butene-1.

4. The process of claim 1 wherein number average molecular weight of the copolymer is controlled to be from about 500 to about 10,000.

5. The process of claim 1 wherein the process is conducted to obtain copolymer having from about 10 to about 75 wt % monomer units derived from conversion of ethylene.

6. The process of claim 1 wherein the reaction temperature is controlled by evaporative cooling.

7. The process of claim 1 wherein the molecular weight distribution of the copolymer product is controlled by selection of metallocene catalyst system.

8. The process of claim 1 wherein the average number molecular weight and ethylene content of said copolymer product is continuously monitored by Nuclear Magnetic Resonance spectroscopy and the information is utilized to make said adjustment of the concentration of said α-olefin in the feed.

9. The process of claim 8 wherein said monitoring is performed by a Dechene Analyzer.

10. A process for continuously producing copolymer by copolymerizing ethylene and an α-olefin in the presence of a metallocene catalyst system, said process comprising continuously supplying into a liquid-phase reaction zone a feed of ethylene, a feed of liquefied α-olefin, a feed of diluent, a feed of metallocene catalyst system, and continuously drawing out a reactor effluent produced thereby; and in accordance with a procedure comprising:
   a) setting the rates of said metallocene system feed and said ethylene feed at a residence time such that the relation:

$$-\partial[E]/\partial t = [E_f]\tau^{-1}$$

is maintained at all times that desired copolymer product is produced, wherein $-\partial[E]/\partial t$ is the total rate at which ethylene concentration vanishes from said reaction zone by reason of incorporation into said copolymer product, $[E_f]$ is the concentration of ethylene in the total feed, and $\tau^{-1}$ is the inverse of said residence time; and
   b) adjusting the concentration of said α-olefin in the feed so as to control the composition of said copolymer product.

11. The process of claim 10 further comprising the additional step of:
   c) adjusting the reaction temperature so as to control the number average molecular weight of said copolymer product.

12. The process of claim 10 wherein the α-olefin is propene.

13. The process of claim 10 wherein the α-olefin is butene-1.

14. The process of claim 10 wherein number average molecular weight of the copolymer is controlled to be from about 500 to about 10,000.

15. The process of claim 10 wherein the process is conducted to obtain copolymer having from about 10 to about 75 wt % monomer units derived from conversion of ethylene.

16. The process of claim 10 wherein the reaction temperature is controlled by evaporative cooling.

17. The process of claim 10 wherein the molecular weight distribution of the copolymer product is controlled by selection of metallocene catalyst system.

18. The process of claim 10 wherein the average number molecular weight and ethylene content of said copolymer product is continuously monitored by Nuclear Magnetic Resonance spectroscopy and the information is utilized to make said adjustment of the concentration of said α-olefin in the feed.

19. The process of claim 18 wherein said monitoring is performed by a Dechene Analyzer.

20. The process of claim 10 wherein the residence time, $\tau^{-1}$, is kept constant.

* * * * *